United States Patent
Patel et al.

(10) Patent No.: US 9,785,607 B2
(45) Date of Patent: Oct. 10, 2017

(54) IN-SITU DIE-TO-DIE IMPEDANCE ESTIMATION FOR HIGH-SPEED SERIAL LINKS

(71) Applicant: Dell Products, LP, Round Rock, TX (US)

(72) Inventors: Bhavesh G. Patel, Austin, TX (US); Bhyrav M. Mutnury, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 323 days.

(21) Appl. No.: 14/537,011

(22) Filed: Nov. 10, 2014

(65) Prior Publication Data

US 2016/0132459 A1    May 12, 2016

(51) Int. Cl.
G06F 13/42    (2006.01)
H04L 25/03    (2006.01)

(52) U.S. Cl.
CPC .... *G06F 13/4295* (2013.01); *H04L 25/03834* (2013.01)

(58) Field of Classification Search
CPC ............... G06F 13/4295; H04L 25/03834
See application file for complete search history.

(56) References Cited

U.S. PATENT DOCUMENTS

| | | | |
|---|---|---|---|
| 6,269,328 B1 | 7/2001 | Hirano | |
| 8,654,898 B2 | 2/2014 | Bereza et al. | |
| 2002/0053899 A1* | 5/2002 | Adamian | G01R 27/28 324/76.19 |
| 2005/0194981 A1* | 9/2005 | Cole | G01R 27/28 324/615 |
| 2007/0041511 A1* | 2/2007 | Tan | G01R 13/029 379/30 |
| 2008/0162740 A1 | 7/2008 | Jarboe et al. | |
| 2009/0315565 A1* | 12/2009 | Wyar | G01R 31/11 324/533 |
| 2010/0246657 A1 | 9/2010 | Ou | |
| 2010/0332165 A1* | 12/2010 | Morrison | G01R 31/3662 702/63 |
| 2013/0301695 A1 | 11/2013 | Nishi | |

* cited by examiner

*Primary Examiner* — Eric Oberly
(74) *Attorney, Agent, or Firm* — Larson Newman, LLP

(57) ABSTRACT

A receiver includes an analog-to-digital converter (ADC) module that receives a test signal via a transmission channel and provides a time domain representation of the test signal as received by the receiver, and a processor that determines a time domain representation of an impedance of the transmission channel based on the time domain representation of the test signal.

20 Claims, 3 Drawing Sheets

IN-SITU DIE-TO-DIE IMPEDANCE ESTIMATION FOR HIGH-SPEED SERIAL LINKS

FIELD OF THE DISCLOSURE

This disclosure generally relates to information handling systems, and more particularly relates to in-situ die-to-die impedance estimation for high-speed serial links.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training. However, as speed increases, such best-effort processes are increasingly unable to produce settings that are indeed good enough.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
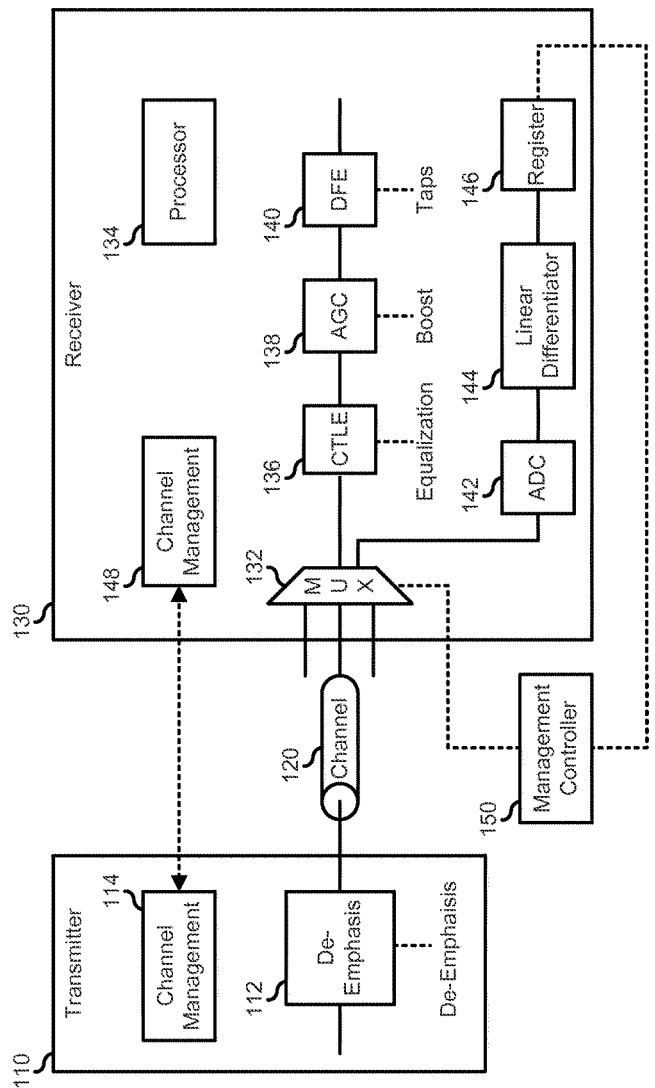
FIG. 1 illustrates an information handling system with a high speed serial interface according to an embodiment of the present disclosure.

FIG. 1 illustrates an embodiment of a high speed serial channel 100 of an information handling system. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter 110, a transmission channel 120, and receiver 130, and a management controller interface 150. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 100 operates in a link characterization mode to direct transmitter 110 to provide a test pattern that represents a step function stimulus of transmission channel 120. Receiver 130 then operates to receive and record the test pattern, as modified by the action of the impedance characteristics of transmission channel 120, and to estimate the impedance characteristics of the transmission channel. In particular, receiver 130 measures and records a time domain representation of the test signal as received by the receiver. The time domain representation of the test signal is used to estimate a time domain pulse response of transmission channel 120. A Fast Fourier Transform (FFT) of the pulse response is performed to obtain a frequency domain representation of the pulse response ($S_{21}$). The frequency domain representation of the transmission channel impedance ($S_{11}$) is then estimated and an inverse FFT (IFFT) of the frequency domain representation of the transmission channel impedance is performed to obtain the time domain representation of the transmission channel impedance.

In this way, as opposed to design studies and circuit simulations, the actual transmission channel impedance is derived on the actual circuit board, using the actual transmitter and the actual receiver, thereby taking real-time, in-situ measurements that account for variations in the transmitter integrated circuit (IC), the receiver IC, the circuit board, any variations in connections, connectors, and cables, or other sources of circuit variation. Here, the variations due to manufacturing tolerances and vendor specific performance, can be quickly and easily accounted for, and problems can be isolated to circuit device performance, trace layout performance, connection, connector, and cable performance, and the like. Moreover, where multiple transmission channels are present on a system design, variations between the transmission channels can be easily characterized and analyzed, and problems identified in order to improve transmission channel performance, system yield, and the like.

In a particular embodiment, the test pattern provided by transmitter 110 consists of 500 zeros (0) followed by 1500 ones (1), thereby providing a step function input to transmission channel 120 and to receiver 130. In another embodiment, different numbers of zeros and ones are provided such that the output of transmitter 110 represents a step function input to transmission channel 120 and to receiver 130. In particular, the ratio of ones to zeros can be 3:1, or can be a different ratio. In another embodiment, the test pattern provided by transmitter 110 is repeatedly provided to receiver 130, such that the estimation of the transmission channel impedance is based upon a large number of iterations of the test pattern. For example, the test pattern can be provided 100 times, 1000 times, 5000 times, or another number of times as needed or desired.

As used herein, transmission channel 120 represents the entire path between the output of transmitter 110 and the input of receiver 130. As such, transmission channel 120 can be representative of a sum of an impedance between the output of transmitter 110 and a connection of the transmitter, an impedance of the connection between the transmitter and a circuit board of serial channel 100, an impedance of a trace on the circuit board between the transmitter and receiver 130, an impedance of the connection between the circuit board and the receiver, an impedance between the connection of the receiver and the input of the receiver, and of any other transmission channel discontinuities, such as connectors, cables, circuit stubs, or other impedances of a transmission channel.

Transmitter 110 includes a de-emphasis module 112 and a channel management module 114. In operation, serial data is provided to de-emphasis module 112, and the de-emphasis module operates to provide a reduction in the signal levels of the serial data after a first data bit is transmitted, in order to de-emphasize the subsequent data bits and to transmit the de-emphasized serial data to receiver 130 via transmission channel 120. The amount of de-emphasis is determined based upon a de-emphasis setting. For example, transmitter 110 can support 21 settings which each prescribe a different amount of de-emphasis, from 0 dB to 10 dB, in 0.5 dB steps. Other numbers of settings and amounts of de-emphasis prescribe by the settings can be utilized, as needed or desired. Channel management module 114 will be described below.

Receiver 130 includes a multiplexor 132, a processor module 134, a continuous time linear equalization (CTLE) module 136, an automatic gain control (AGC) module 138, a decision feedback equalization (DFE) module 140, an analog-to-digital converter (ADC) module 142, a linear differentiator 144, a register 146, and a channel management module 148. In a normal operation mode, multiplexor 132 provides a received signal to CTLE module 136, AGC module 138, and DFE module 140, and to set various compensation values within receiver 130 to provide a compensated output signal.

In the link characterization mode, the test pattern is received by multiplexor 132, and the multiplexor provides the test signal to ADC module 142, linear differentiator 144, and register 146 to obtain the time domain step response of transmission channel 120. A digital representation of the time domain step response of transmission channel 120 is stored in register 146. In a particular embodiment, processor 134 operates to estimate the time domain pulse response of transmission channel 120, to perform the FFT of the pulse response to obtain the frequency domain representation of the pulse response ($S_{21}$), to estimate the transmission channel impedance ($S_{11}$), and to perform the IFFT of the frequency domain representation of the transmission channel impedance to obtain the time domain representation of the transmission channel impedance. Here the time domain representation of the transmission channel impedance is provided to management controller 150 for further analysis, as needed or desired.

In another embodiment, the digital representation of the time domain step response of transmission channel 120 is provided by register 146 to management controller 150, and another device of system receives the time domain representation of the transmission channel impedance. Here, the device estimates the time domain pulse response of transmission channel 120, performs the FFT of the pulse response to obtain the frequency domain representation of the pulse response ($S_{21}$), estimates the transmission channel impedance ($S_{11}$), and performs the IFFT of the frequency domain representation of the transmission channel impedance to obtain the time domain representation of the transmission channel impedance.

Figure 2:
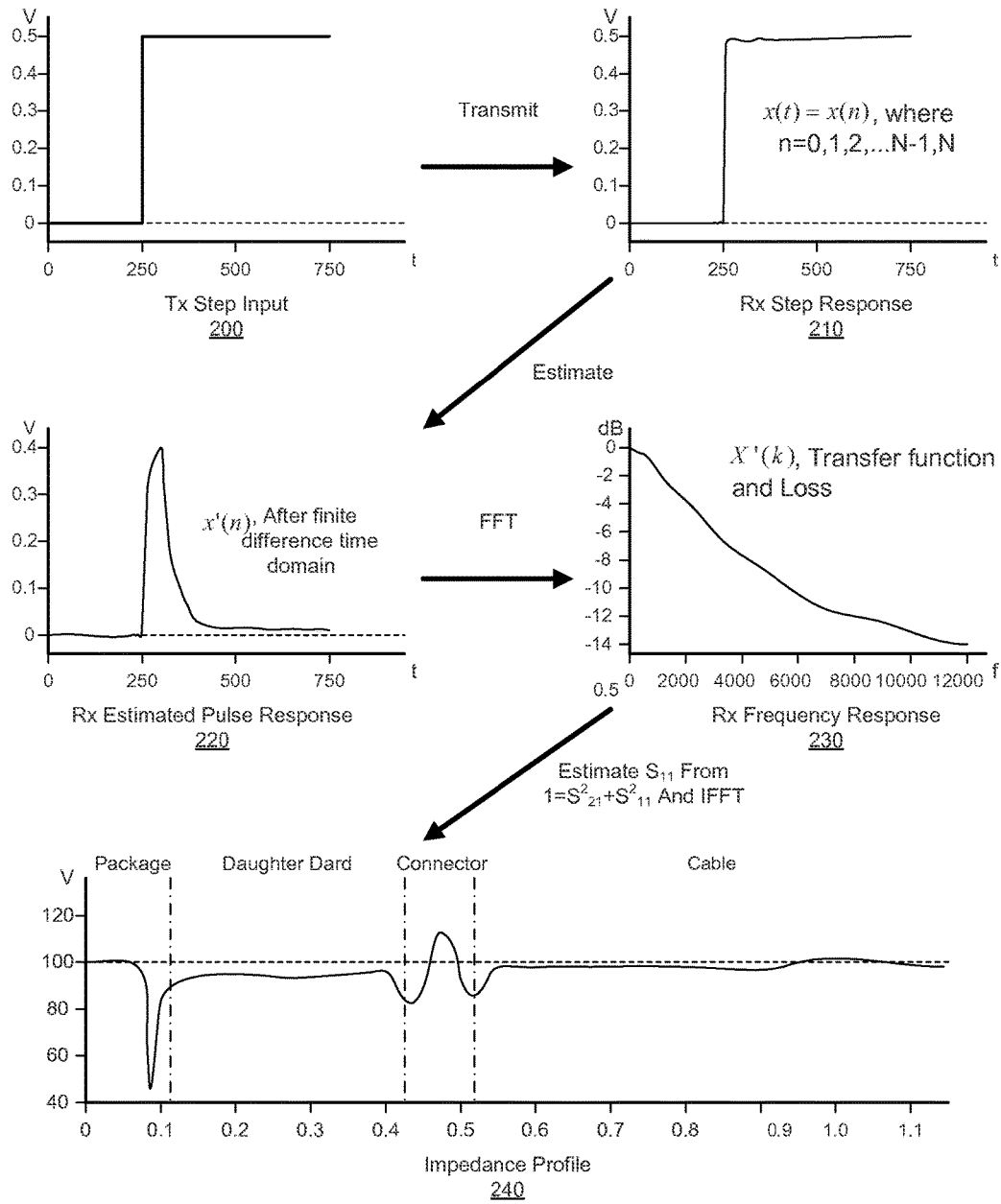
FIG. 2 illustrates a method of obtaining the time domain representation of the transmission channel impedance based upon the transmission by a transmitter of a test pattern that provides a step function according to an embodiment of the present disclosure.

FIG. 2 illustrates a method of obtaining the time domain representation of the transmission channel impedance based upon the transmission by a transmitter of a test pattern that provides a step function, as shown in the graph 200. Here, 500 zeros (0) are followed by 1500 ones (1). The test pattern is transmitted to a receiver and the receiver receives and records the test pattern, as modified by the action of the impedance characteristics of the transmission channel, as shown in graph 210. The receiver can capture a discrete time domain representation of the received test pattern, such that:

$$x(t)=x(n) \qquad \text{Equation 1}$$

where n=0, 1, 2, . . . N−1, N. The time domain pulse response is estimated from the discrete time domain step response by estimating the finite difference function, as shown in graph 220, such that:

$$x'(t) = \frac{x(n+1) - x(n)}{\Delta t}; x'(n) = x(n+1) - x(n) \qquad \text{Equation 2}$$

The FFT of the finite difference function is performed to obtain a frequency domain representation of the pulse response ($S_{21}$), as shown in graph 230, such that:

$$X(k) = \sum_{n=0}^{N-1} x(n) \cdot e^{-i\left(\frac{2\pi}{N}\right)kn} \qquad \text{Equation 3}$$

where k=0, 1, 2, . . . N−1, N. Note that the transfer function value at the frequency of interest is given as k/2π. As such, the transfer function of the return loss is estimated as:

$$y(k) = \sum_{n=0}^{N-1} \sqrt{1 - x(k)^2} \qquad \text{Equation 4}$$

The frequency domain representation of the transmission channel impedance ($S_{11}$) is then estimated using:

$$1 = S_{21}^2 + S_{11}^2 \qquad \text{Equation 5}$$

and the IFFT of the frequency domain representation of the transmission channel impedance is performed to obtain the time domain representation of the transmission channel impedance, as shown in graph 240, such that:

$$y(n) = \frac{1}{N} \sum_{n=0}^{N-1} y(k) \cdot e^{i\left(\frac{2\pi}{N}\right)kn} \qquad \text{Equation 6}$$

where n=0, 1, 2, . . . N−1, N.

Figure 3:
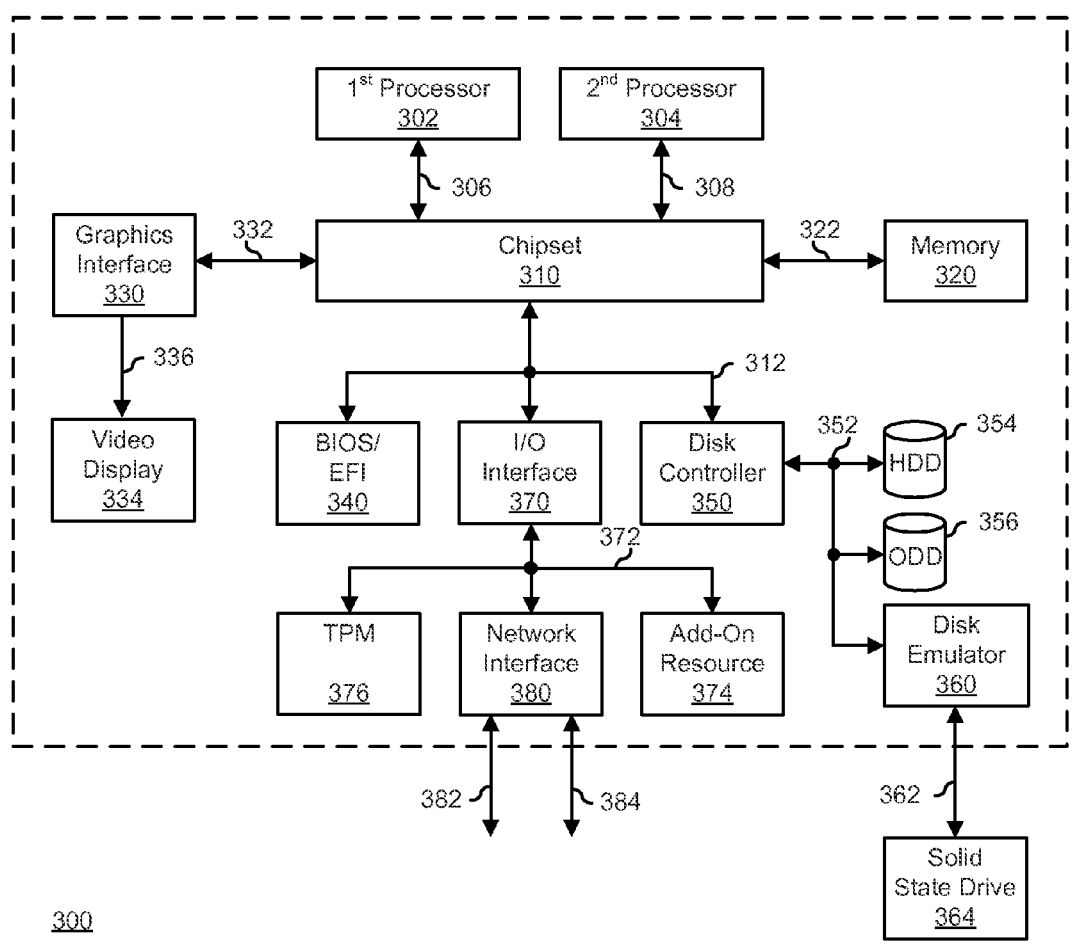
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver, comprising:
a multiplexor including an input coupled to a transmission channel;
an equalizer coupled to a first output of the multiplexor, the multiplexor configured to provide a data signal to the equalizer in a first mode;
an analog-to-digital converter (ADC) module coupled to a second output of the multiplexor, the multiplexor further configured to provide a test signal to the ADC module in a second mode, the ADC module to provide a time domain representation of the test signal as received by the receiver; and
a processor configured to determine a time domain representation of an impedance of the transmission channel based on the time domain representation of the test signal.

2. The receiver of claim 1 wherein in determining the time domain representation of the impedance of the transmission channel, the processor further estimates a time domain pulse response of the transmission channel ($S_{21}$) based upon the time domain representation of the test signal.

3. The receiver of claim 2 wherein in estimating the time domain pulse response, the processor further estimates a finite difference function based upon the time domain representation of the test signal, such that $$x'(t) = \frac{x(n+1) - x(n)}{\Delta t}$$

where x(n) is the time domain representation of the test signal at a discrete time n, and
where n=0, 1, 2, ... N−1, N.

4. The receiver of claim 2 wherein in determining the time domain representation of the impedance of the transmission channel, the processor further performs a Fast Fourier Transform (FFT) on the time domain pulse response of the transmission channel, such that $$X(k) = \sum_{n=0}^{N-1} x(n) \cdot e^{-i\left(\frac{2\pi}{N}\right)kn}$$

where X(k) is a frequency domain representation of the pulse response of the transmission channel ($S_{21}$), and
k=0, 1, 2, ... N−1, N.

5. The receiver of claim 4 wherein in determining the time domain representation of the impedance of the transmission channel, the processor further estimates a frequency domain representation of the impedance of the transmission channel ($S_{11}$).

6. The receiver of claim 5 wherein, in estimating the frequency domain representation of the impedance of the transmission channel ($S_{11}$), the processor operates such that $$1 = S_{21}^2 + S_{11}^2.$$

7. The receiver of claim 5 wherein in determining the time domain representation of the impedance of the transmission channel, the processor further performs an Inverse FFT on the frequency domain representation of the impedance of the transmission channel ($S_{11}$), such that $$y(n) = \frac{1}{N}\sum_{n=0}^{N-1} y(k) \cdot e^{i\left(\frac{2\pi}{N}\right)kn}.$$

8. A method comprising:
  receiving, at a multiplexor of a receiver, a data signal via a transmission channel;
  providing, by the multiplexor in a first mode, the data signal to an equalizer of the receiver;
  receiving, at the multiplexor, a test signal via the transmission channel;
  providing, by the multiplexor in a second mode, the test signal to an analog-to-digital converter (ADC) module of a receiver;
  providing, by the ADC module, a time domain representation of the test signal as received by the receiver; and
  determining, by a processor of the receiver, a time domain representation of an impedance of the transmission channel based on the time domain representation of the test signal.

9. The method of claim 8 wherein in determining the time domain representation of the impedance of the transmission channel, the method further comprises:
  estimating a time domain pulse response of the transmission channel ($S_{21}$) based upon the time domain representation of the test signal.

10. The method of claim 9 wherein in estimating the time domain pulse response, the method further comprises:
  estimating a finite difference function based upon the time domain representation of the test signal, such that $$x'(t) = \frac{x(n+1) - x(n)}{\Delta t}$$

where x(n) is the time domain representation of the test signal at a discrete time n,
  and where n=0, 1, 2, . . . N−1, N.

11. The method of claim 9 wherein in determining the time domain representation of the impedance of the transmission channel, the method further comprises:
  performing a Fast Fourier Transform (FFT) on the time domain pulse response of the transmission channel, such that $$X(k) = \sum_{n=0}^{N-1} x(n) \cdot e^{-i\left(\frac{2\pi}{N}\right)kn}$$

where X(k) is a frequency domain representation of the pulse response of the
  transmission channel ($S_{21}$), and k=0, 1, 2, . . . N−1, N.

12. The method of claim 11 wherein in determining the time domain representation of the impedance of the transmission channel, the method further comprises:
  estimating a frequency domain representation of the impedance of the transmission channel ($S_{11}$).

13. The method of claim 12 wherein, in estimating the frequency domain representation of the impedance of the transmission channel ($S_{11}$), the method operates such that $$1 = S_{21}^2 + S_{11}^2.$$

14. The method of claim 12 wherein in determining the time domain representation of the impedance of the transmission channel, the method further comprises:
  performing an Inverse FFT on the frequency domain representation of the impedance of the transmission channel ($S_{11}$), such that $$y(n) = \frac{1}{N}\sum_{n=0}^{N-1} y(k) \cdot e^{i\left(\frac{2\pi}{N}\right)kn}.$$

15. A non-transitory computer-readable medium including code for performing a method, the method comprising:
  receiving, at a multiplexor of a receiver, a data signal via a transmission channel;
  providing, by the multiplexor in a first mode, the data signal to an equalizer of the receiver;
  receiving, at the multiplexor, a test signal via the transmission channel;
  providing, by the multiplexor in a second mode, the test signal to an analog-to-digital converter (ADC) module of a receiver;
  providing, by the ADC module, a time domain representation of the test signal as received by the receiver; and
  determining, by a processor of the receiver, a time domain representation of an impedance of the transmission channel based on the time domain representation of the test signal.

16. The computer-readable medium of claim 15 wherein in determining the time domain representation of the impedance of the transmission channel, the method further comprises:
  estimating a time domain pulse response of the transmission channel ($S_{21}$) based upon the time domain representation of the test signal.

17. The computer-readable medium of claim 16 wherein in estimating the time domain pulse response, the method further comprises:
  estimating a finite difference function based upon the time domain representation of the test signal, such that $$x'(t) = \frac{x(n+1) - x(n)}{\Delta t}$$

where x(n) is the time domain representation of the test signal at a discrete time n,
  and where n=0, 1, 2, . . . N−1, N.

18. The computer-readable medium of claim 16 wherein in determining the time domain representation of the impedance of the transmission channel, the method further comprises:
  performing a Fast Fourier Transform (FFT) on the time domain pulse response of the transmission channel, such that $$X(k) = \sum_{n=0}^{N-1} x(n) \cdot e^{-i\left(\frac{2\pi}{N}\right)kn}$$

where X(k) is a frequency domain representation of the pulse response of the transmission channel ($S_{21}$), and k=0, 1, 2, . . . N−1, N.

19. The computer-readable medium of claim 18 wherein in determining the time domain representation of the impedance of the transmission channel, the method further comprises:

estimating a frequency domain representation of the impedance of the transmission channel ($S_{11}$), where $1 = S_{21}^2 + S_{11}^2$.

20. The computer-readable medium of claim 19 wherein in determining the time domain representation of the impedance of the transmission channel, the method further comprises:

performing an Inverse FFT on the frequency domain representation of the impedance of the transmission channel ($S_{11}$), such that $$y(n) = \frac{1}{N} \sum_{n=0}^{N-1} y(k) \cdot e^{i\left(\frac{2\pi}{N}\right)kn}.$$

* * * * *